(12) United States Patent
Taki

(10) Patent No.: US 8,457,834 B2
(45) Date of Patent: Jun. 4, 2013

(54) ABNORMALITY JUDGMENT DEVICE AND VEHICLE CONTROLLER

(75) Inventor: Kenichi Taki, Ueda (JP)

(73) Assignee: Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 13/364,743

(22) Filed: Feb. 2, 2012

(65) Prior Publication Data

US 2012/0203423 A1 Aug. 9, 2012

(30) Foreign Application Priority Data

Feb. 3, 2011 (JP) .................................. 2011-022101

(51) Int. Cl.
*G01M 17/00* (2006.01)

(52) U.S. Cl.
USPC ........................................................ 701/29.7

(58) Field of Classification Search
USPC .................... 701/29.1, 29.7, 30.8, 30.9, 31.1, 701/31.3, 41
See application file for complete search history.

(56) References Cited

U.S. PATENT DOCUMENTS

| 5,029,466 A | * | 7/1991 | Nishihara et al. .......... 73/117.02 |
| 2007/0282558 A1 | * | 12/2007 | Sagisaka ....................... 702/116 |
| 2007/0294007 A1 | * | 12/2007 | Katrak ............................ 701/41 |

FOREIGN PATENT DOCUMENTS

JP 2003-042754 2/2003

* cited by examiner

*Primary Examiner* — Kim T Nguyen
(74) *Attorney, Agent, or Firm* — Andrew M. Calderon; Roberts Mlotkowski Safran & Cole, P.C.

(57) ABSTRACT

According to an aspect of the present invention, there is provided an abnormality judgment device including: a change amount calculator configured to calculate a change amount between currently-obtained and previously-obtained steering angles; a storage section configured to store a threshold value; a reference setting section configured to set a reference steering angle; an incrementing section configured to continue gradually incrementing the threshold value after the change amount exceeds the threshold value, for a judgment time; a deviation comparator configured to compare an absolute deviation between the currently-obtained steering angle and the reference steering angle with the threshold value, and to count a counter when the absolute deviation exceeds the threshold value; and a judgment section configured to judge that the steering angle sensor is abnormal when the counter reaches a predetermined value.

6 Claims, 13 Drawing Sheets

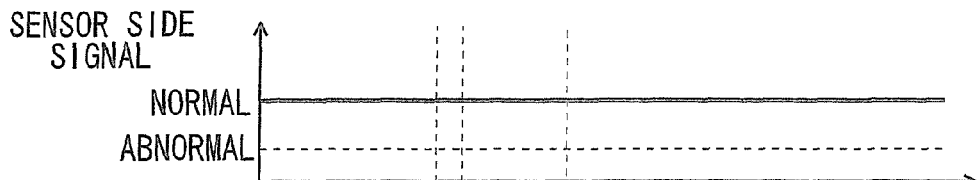
FIG. 5A SENSOR SIDE SIGNAL
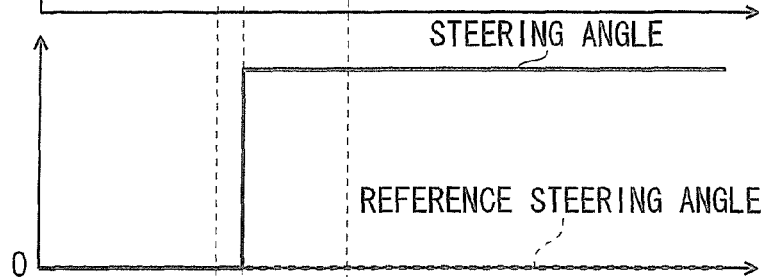
FIG. 5B
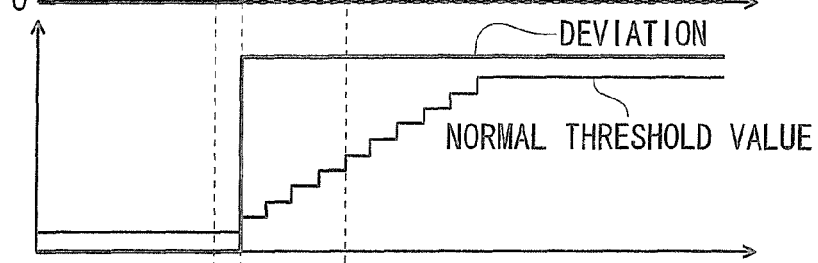
FIG. 5C
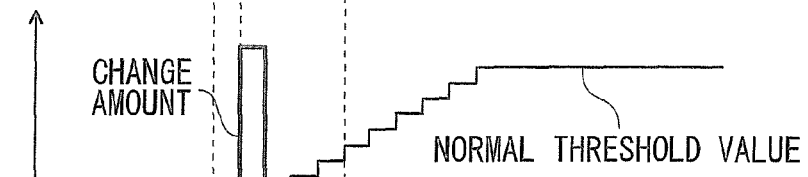
FIG. 5D
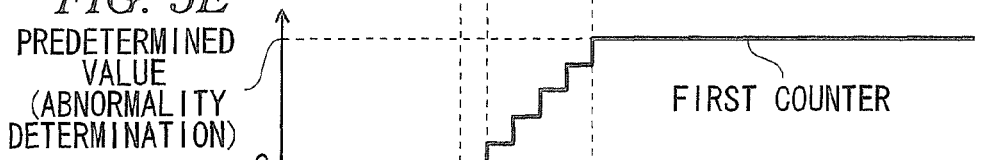
FIG. 5E PREDETERMINED VALUE (ABNORMALITY DETERMINATION)
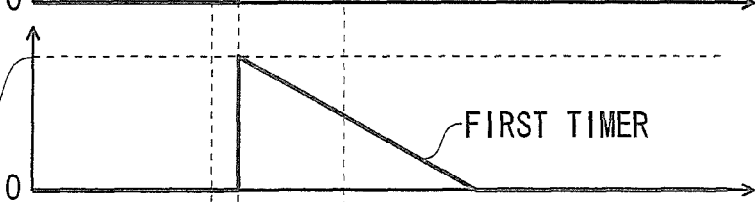
FIG. 5F FIRST JUDGMENT TIME
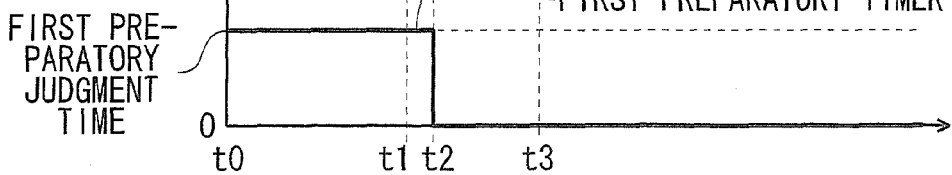
FIG. 5G FIRST PREPARATORY JUDGMENT TIME

*FIG. 6A*
SENSOR SIDE SIGNAL
NORMAL
ABNORMAL

*FIG. 6B*
STEERING ANGLE
REFERENCE STEERING ANGLE
0

*FIG. 6C*
DEVIATION
NORMAL THRESHOLD VALUE
0

*FIG. 6D*
CHANGE AMOUNT
NORMAL THRESHOLD VALUE
0

*FIG. 6E*
PREDETERMINED VALUE (ABNORMALITY DETERMINATION)
FIRST COUNTER
0

*FIG. 6F*
FIRST JUDGMENT TIME
FIRST TIMER
0

*FIG. 6G*
FIRST PRE-PARATORY JUDGMENT TIME
FIRST PREPARATORY TIMER
0 t4 t5 t6 t7

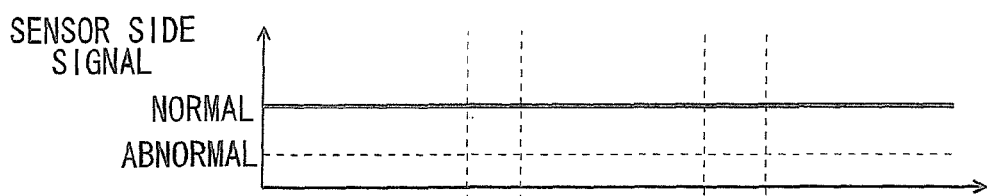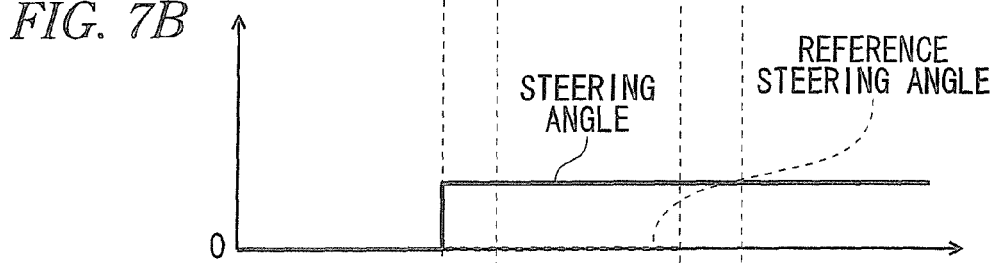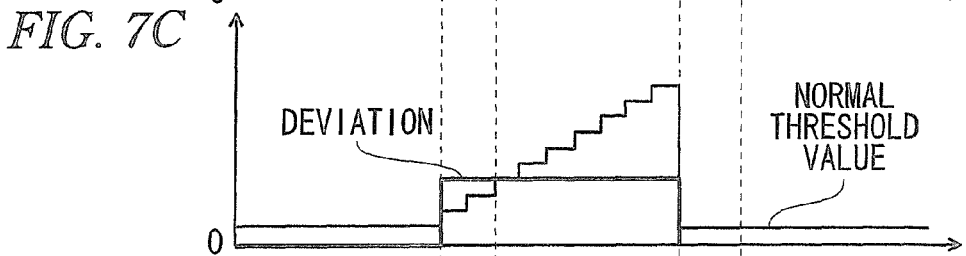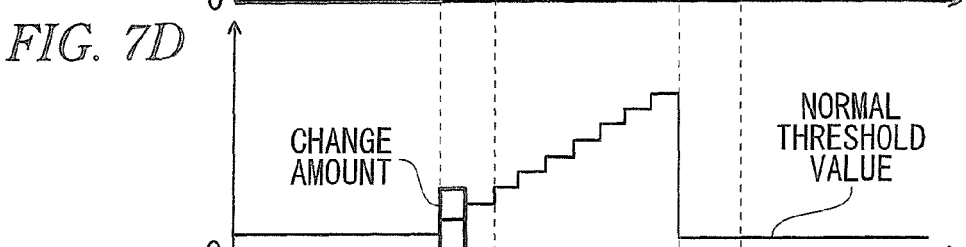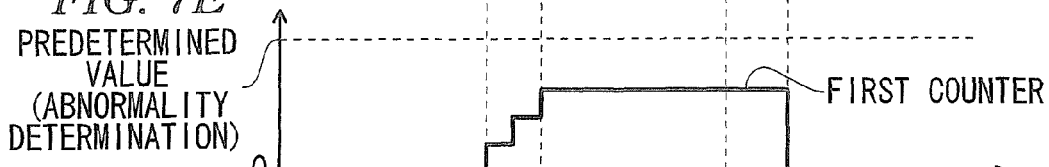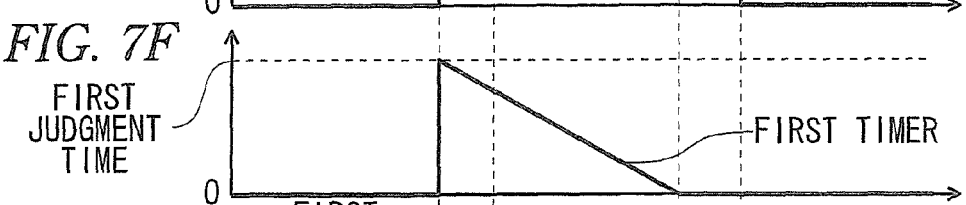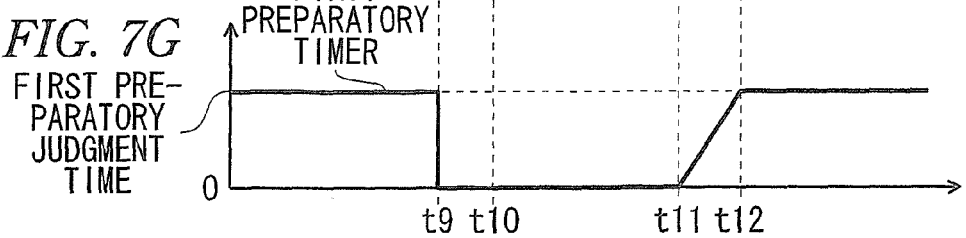

SENSOR SIDE SIGNAL
NORMAL
ABNORMAL

STEERING ANGLE
REFERENCE STEERING ANGLE

DEVIATION
NORMAL THRESHOLD VALUE

CHANGE AMOUNT
NORMAL THRESHOLD VALUE

PREDETERMINED VALUE (ABNORMALITY DETERMINATION)
FIRST COUNTER

FIRST JUDGMENT TIME
FIRST TIMER

FIRST PREPARATORY JUDGMENT TIME
FIRST PREPARATORY TIMER t13 t14    t15 t16

SENSOR SIDE SIGNAL
NORMAL
ABNORMAL

STEERING ANGLE
REFERENCE STEERING ANGLE

DEVIATION
NORMAL THRESHOLD VALUE

CHANGE AMOUNT
NORMAL THRESHOLD VALUE

PREDETERMINED VALUE (ABNORMALITY DETERMINATION)
FIRST COUNTER

FIRST JUDGMENT TIME
FIRST TIMER

FIRST PREPARATORY JUDGMENT TIME
FIRST PREPARATORY TIMER t17 t18   t19 t20 t21

ABNORMALITY JUDGMENT DEVICE AND VEHICLE CONTROLLER

CROSS-REFERENCE TO RELATED APPLICATION(S)

This application claims priority from Japanese Patent Application No. 2011-022101 filed on Feb. 3, 2011, the entire contents of which are incorporated herein by reference.

FIELD

The present invention relates to an abnormality judgment device capable of diagnosing whether a steering angle sensor for detecting a steering angle is normal and to a vehicle controller equipped with such abnormality judgment device.

BACKGROUND

For example, JP-2003-042754-A proposes a vehicle controller capable of diagnosing a steering angle sensor. The vehicle controller judges that the steering angle sensor is abnormal when the angular velocity calculated from the output value of the steering angle sensor exceeds an allowable maximum angular velocity.

In the above-mentioned vehicle controller, when the calculated angular velocity even once exceeds the allowable maximum angular velocity, the steering angle sensor is judged as abnormal. Hence, the steering angle sensor may be misjudged as abnormal, even when the angular velocity becomes more than the allowable maximum angular velocity temporarily due to noise or the like (even when the angular velocity becomes more than the allowable maximum angular velocity momentarily but then returns to its original value), for example.

SUMMARY

According to an aspect of the present invention, there is provided an abnormality judgment device having a first diagnosing section configured to perform a first diagnosis for judging whether a steering angle sensor is normal, the first diagnosing section periodically obtaining a steering angle from the steering angle sensor, the first diagnosing section including: a first change amount calculator configured to calculate an absolute difference between a currently-obtained steering angle and a previously-obtained steering angle, as a change amount; a first storage section configured to store a maximum value of the change amount which is calculable by the first change amount calculator when the steering angle sensor is normal, as a normal threshold value; a reference setting section configured to set the previously-obtained steering angle as a reference steering angle when the change amount exceeds the normal threshold value; an incrementing section configured to continue gradually incrementing the normal threshold value after the change amount exceeds the normal threshold value, for a first judgment time; a deviation comparator configured to compare an absolute deviation between the currently-obtained steering angle and the reference steering angle with the gradually-incremented normal threshold value, and to count a first counter when the absolute deviation exceeds the normal threshold value, for the first judgment time; and a first judgment section configured to judge that the steering angle sensor is abnormal when the first counter reaches a predetermined value within the first judgment time.

With this configuration, even when the change amount temporarily becomes more than the normal threshold value, if the value of the first counter has not reached the predetermined value, the steering angle sensor is not judged as abnormal. Hence, in the diagnosis for the steering angle sensor, misjudgment can be prevented. In particular, the condition for judging that the steering angle sensor is abnormal becomes stricter as the normal threshold value to be used as a counting condition is made larger gradually by the incrementing section, whereby the possibility of misjudgment can be reduced. When abnormality occurs because the steering angle is maintained, fixed or offset to an abnormally high value, the value of the first counter reaches the predetermined value, whereby the abnormality can be judged securely.

The incrementing section may continue adding a constant value to the normal threshold value each time the deviation comparator performs a comparison so that the normal threshold value becomes proportional to the number of comparisons.

With this configuration, the normal threshold value can be determined by simple increment, whereby it is not necessary to prepare complicated calculating formulas and complicated maps.

After a passage of the first judgment time, the first judgment section may judge whether the change amount is kept below the normal threshold value for a first preparatory judgment time, and may reset the first counter when the change amount is kept below the normal threshold value for the first preparatory judgment time.

With this configuration, even after the first preparatory judgment time has passed, the value of the first counter is not reset but maintained until the first preparatory judgment time passes. Hence, even when the change amount and the deviation return to their normal values temporarily and the steering angle sensor is not judged as abnormal, when the change amount becomes more than the normal threshold value again during the first preparatory judgment time, the abnormality can be judged easily.

According to another aspect of the present invention, there is provided an abnormality judgment device having a second diagnosing section configured to perform a second diagnosis for judging whether a steering angle sensor is normal, the second diagnosing section periodically obtaining a steering angle from the steering angle sensor, the second diagnosing section including: a second change amount calculator configured to calculate an absolute difference between a currently-obtained steering angle and a previously-obtained steering angle, as a change amount; a second storage section configured to store a maximum value of the change amount which is calculable by the second change amount calculator when the steering angle sensor is normal, as a normal threshold value; a change amount comparator configured to compare the change amount with the normal threshold value, and to count a second counter when the change amount exceeds the normal threshold value; and a second judgment section configured to judge whether the second counter reaches a predetermined value each time the change amount exceeds the normal threshold value, to judge that the steering angle sensor is abnormal when the second counter reaches the predetermined value, and to reset the second counter when a second judgment time has passed while the second counter is kept below the predetermined value after the second counter is last counted.

With this configuration, even when the change amount temporarily becomes more than the normal threshold value, if the value of the second counter has not reached the predetermined value, the steering angle sensor is not judged as abnormal. Hence, in the diagnosis for the steering angle sensor, misjudgment can be prevented. When the value obtained from the steering angle sensor oscillates or continuous noise is generated, since the value of the second counter reaches the predetermined value, the abnormality can be judged securely.

Both of the first diagnosis and the second diagnosis may be performed simultaneously while commonly using the steering angle and the change amount for each diagnosis.

With this configuration, the first diagnosis and the second diagnosis can be performed collaterally by using the common values as the steering angle and the change amount. Hence, the abnormality can be judged rapidly by using two different diagnosing methods according to information on a single steering angle.

The above-mentioned abnormality judgment device may be provided in a vehicle controller, for example.

For example, the steering angle sensor may also have a diagnosis function. With this configuration, even when the steering angle sensor is misjudged as normal due to the abnormality of the diagnosis function therefor, or even when the value output from the steering angle sensor becomes abnormal before reaching the vehicle controller due to the transmission error, the diagnosis can be performed using the abnormality judgment device inside the vehicle controller. As a result, the accuracy of abnormality judgment can be improved.

With the present invention, misjudgment can be prevented when diagnosing the steering angle sensor.

BRIEF DESCRIPTION OF DRAWINGS

FIGS. 5A to 5G illustrate a diagnosis example when the steering angle of the vehicle is fixed to a large value;

FIGS. 6A to 6G illustrate a diagnosis example when the steering angle is offset in two steps;

FIGS. 7A to 7G illustrate a diagnosis example when the steering angle is not changed very largely;

DETAILED DESCRIPTION

[First Embodiment]

A first embodiment will be described below.

Figure 1:
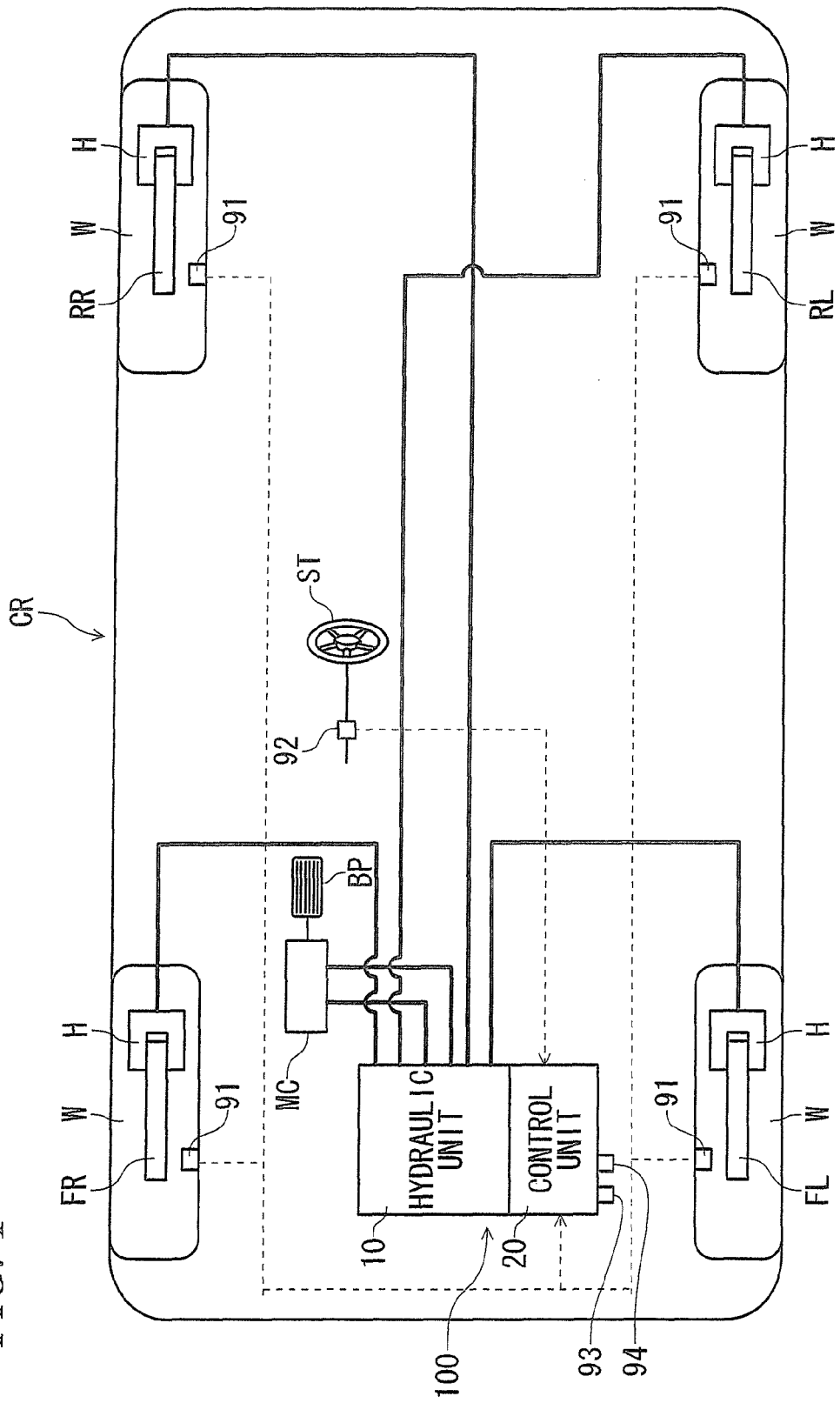
FIG. 1 illustrates a vehicle equipped with a vehicle controller.

As shown in FIG. 1, a vehicle controller 100 is configured to appropriately control a braking force (brake fluid pressure) applied to each wheel W of a vehicle CR. For example, the vehicle controller 100 is provided inside the engine room of the vehicle. The vehicle controller 100 has a hydraulic unit 10 and a control unit 20. The hydraulic unit 10 includes fluid passages (hydraulic passages) and various components, and the control unit 20 controls the components of the hydraulic unit 10.

The control unit 20 is, for example, equipped with a CPU, a RAM, a ROM and input/output circuits, and performs control with various arithmetic processing based not only on the input from a wheel speed sensor 91, a steering angle sensor 92, a lateral acceleration sensor 93 and a yaw rate sensor 94, but also on programs and data stored in the ROM.

The wheel speed sensor 91 is provided for each wheel W to detect the rotation speed thereof.

The steering angle sensor 92 is provided on the rotation shaft of the steering wheel ST to detect the steering angle thereof.

The lateral acceleration sensor 93 is integrally provided on the control unit 20 to detect the acceleration (lateral acceleration) exerted in the lateral direction of the vehicle CR.

The yaw rate sensor 94 is integrally provided on the control unit 20 to detect the turning angular velocity (actual yaw rate) of the vehicle CR.

Each of wheel cylinders H is a hydraulic device for converting the brake fluid pressure generated by a master cylinder MC and the vehicle controller 100 into the actuating force of each of the wheel brakes FR, FL, RR and RL provided for each wheel W. The wheel cylinders H are respectively connected to the hydraulic unit 10 via pipes.

Figure 2:
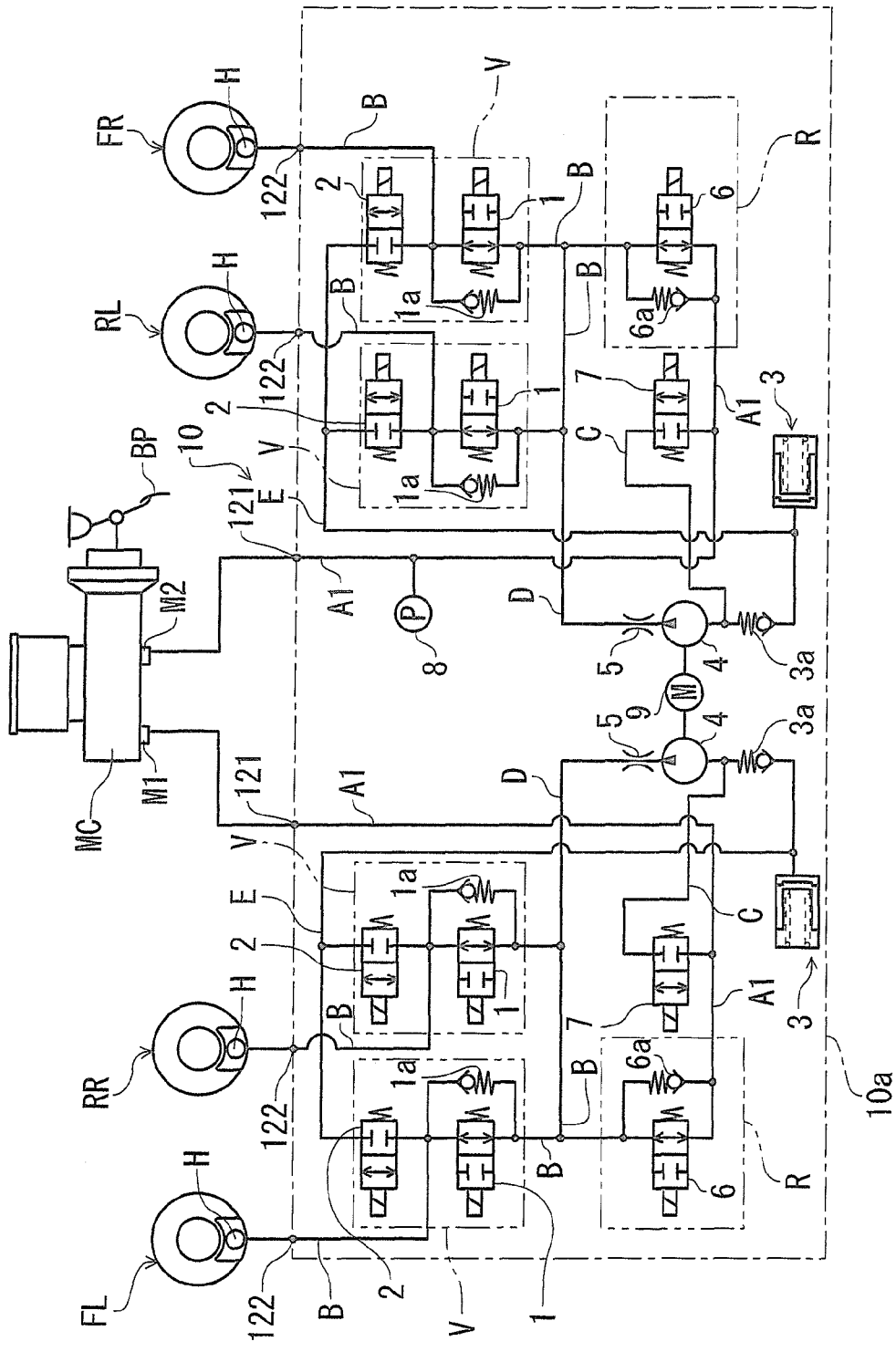
FIG. 2 illustrates a brake hydraulic circuit of the vehicle controller.

As shown in FIG. 2, the hydraulic unit 10 is disposed between the master cylinder MC and the wheel brakes FR, FL, RR and RL. The master cylinder MC serves as a hydraulic source for generating brake fluid pressure depending on the driver's depressing force applied to the brake pedal BP. The hydraulic unit 10 is formed of a pump body 10a serving as a base body having fluid passages through which brake fluid flows, plural input valves 1 and plural output valves 2 disposed in the fluid passages, etc.

The pump body 10a has inlet ports 121 and outlet ports 122. The inlet ports 121 are connected to two output ports M1 and M2 of the master cylinder MC, and the outlet ports 122 of the pump body 10a are respectively connected to the wheel brakes FR, FL, RR and RL. In the pump body 10a, the inlet ports 121 and the outlet ports 122 are usually communicated so that the depressing force applied to the brake pedal BP is transmitted to each wheel brake FL/RR/RL/FR.

The fluid passage starting from the output port M1 leads to the front left wheel brake FL and the rear right wheel brake RR, and the fluid passage starting from the output port M2 leads to the front right wheel brake FR and the rear left wheel brake RL. In the following description, the fluid passage starting from the output port M1 is referred to as a "first system," and the fluid passage starting from the output port M2 is referred to as a "second system."

The first system of the hydraulic unit 10 includes two control valve units V respectively corresponding to the wheel brakes FL and RR. Similarly, the second system of the hydraulic unit 10 includes two control valve units V respectively corresponding to the wheel brakes RL and FR. Each of the first and second systems includes a reservoir 3, a pump 4, an orifice 5, a pressure regulating unit (regulator) R and a suction valve 7. A common motor 9 is provided for driving the pump 4 of the first system and the pump 4 of the second system. The rotation speed of the motor 9 is controllable. In the first embodiment, a pressure sensor 8 is provided only for the second system.

In the following description, the fluid passage from the output port M1/M2 of the master cylinder MC to the pressure regulating unit R is referred to as an "output hydraulic passage A1." The fluid passage from the pressure regulating unit R to the corresponding wheel brakes ("FL and RR" or "RL and FR") is referred to as a "wheel hydraulic passage B." The fluid passage from the output hydraulic passage A1 to the pump 4 is referred to as a "suction hydraulic passage C." The fluid passage from the pump 4 to the wheel hydraulic passage B is referred to as a "discharge hydraulic passage D." And, the fluid passage from the wheel hydraulic passage B to the suction hydraulic passage C is referred to as an "open passage E."

The control valve unit V controls the flow of the fluid under pressure between the master cylinder MC or the pump 4 and each wheel brake FL/RR/RL/FR (each wheel cylinder H), and can increase, retain or decrease the pressure of the wheel cylinder H. The control valve unit V includes an inlet valve 1, an outlet valve 2 and a check valve 1a.

The inlet valve 1 is a normally-open solenoid valve provided between the master cylinder MC and each wheel brake FL/RR/RL/FR, that is, in the wheel hydraulic passage B. Since the inlet valve 1 is normally open, the pressure of the brake fluid is allowed to be transmitted from the master cylinder MC to each wheel brake FL/RR/RL/FR. When the wheel W is likely to lock, the inlet valve 1 is closed by the control unit 20, so that the transmission of the brake fluid pressure from the brake pedal BP to each wheel brake FL/RR/RL/FR is shut off.

The outlet valve 2 is a normally-closed solenoid valve provided between each reservoir 3 and each wheel brake FL/RR/RL/FR, that is, between the wheel hydraulic passage B and the open passage E. Although the outlet valve 2 is normally closed, it is opened by the control unit 20 when the wheel W is likely to lock, so that the brake fluid pressure applied to each wheel brake FL/RR/RL/FR is relieved to each reservoir 3.

The check valve 1a is connected in parallel with each inlet valve 1. The check valve 1a is a one-way valve for allowing the brake fluid to flow only from each wheel brake FL/RR/RL/FR to the master cylinder MC. Even when the input from the brake pedal BP is released while the inlet valve 1 is closed, the check valve 1a allows the brake fluid to flow from each wheel brake FL/RR/RL/FR to the master cylinder MC.

The reservoir 3 is provided in the open passage E to absorb the brake fluid pressure that is relieved when each outlet valve 2 is opened. A check valve 3a is provided between the reservoir 3 and the pump 4 to allow the brake fluid to flow only from the reservoir 3 to the pump 4.

The pump 4 is provided between the suction hydraulic passage C communicating with the output hydraulic passage A1 and the discharge hydraulic passage D communicating with the wheel hydraulic passage B to suck the brake fluid stored in the reservoir 3 and to discharge the brake fluid to the discharge hydraulic passage D. As a result, the brake fluid sucked from the reservoir 3 can be returned to the master cylinder MC. Even when the driver does not operate the brake pedal BP, brake fluid pressure is generated, and a braking force can be applied to the wheel brakes FL, RR, RL and FR.

The discharge amount of the brake fluid from the pump 4 depends on the rotation speed of the motor 9. For example, when the rotation speed of the motor 9 becomes high, the discharge amount of the brake fluid from the pump 4 increases.

The orifice 5 attenuates the pulsation of the pressure of the brake fluid discharged from the pump 4.

Since the pressure regulating unit R is normally open, the brake fluid can flow from the output hydraulic passage A1 to the wheel hydraulic passage B. When the pressure on the side of the wheel cylinder H is raised by the pump 4, the pressure regulating unit R adjusts the pressure on the side of the discharge hydraulic passage D, the wheel hydraulic passage B and the wheel cylinder H to a preset value or less while shutting off the flow of the brake fluid. The pressure regulating unit R includes a change-over valve 6 and a check valve 6a.

The change-over valve 6 is a normally-open linear solenoid valve provided between the output hydraulic passage A1 communicating with the master cylinder MC and the wheel hydraulic passage B communicating with each wheel brake FL/RR/RL/FR. When the valve element of the change-over valve 6 is electromagnetically energized to the side of the wheel hydraulic passage B and the wheel cylinder H and when the pressure of the wheel hydraulic passage B becomes higher than the pressure of the output hydraulic passage A1 by a predetermined value (this predetermined value depends on the energization degree of the change-over valve 6) or more, the brake fluid escapes from the wheel hydraulic passage B to the output hydraulic passage A1, whereby the pressure on the side of the wheel hydraulic passage B is adjusted, although the details are not shown in the figure.

The check valve 6a is connected in parallel with each change-over valve 6. The check valve 6a is a one-way valve for allowing the brake fluid to flow from the output hydraulic passage A1 to the wheel hydraulic passage B.

The suction valve 7 is a normally-closed solenoid valve provided in the suction hydraulic passage C. The suction valve 7 switches the suction hydraulic passage C to an open state or a closed state. When the change-over valve 6 is closed, that is, when the brake fluid pressure is to be applied to each wheel brake FL/RR/RL/FR while the driver does not operate the brake pedal BP, the suction valve 7 is opened by the control unit 20.

The pressure sensor 8 detects the brake fluid pressure of the output hydraulic passage A1 of the second system, and its detection result is input to the control unit 20.

Next, the details of the control unit 20 will be described below.

Figure 3:
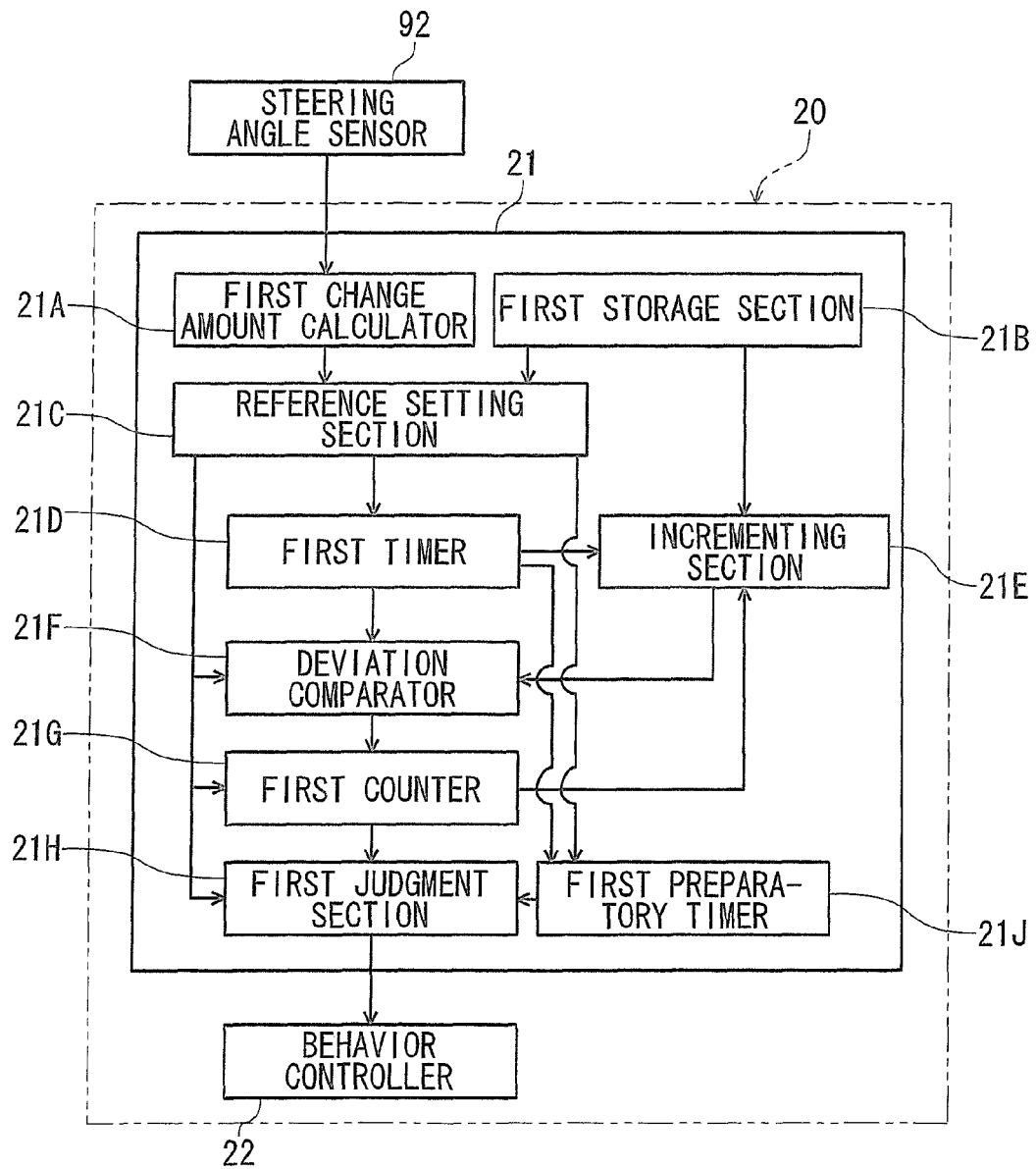
FIG. 3 illustrates a control unit according to a first embodiment.

As shown in FIGS. 1 to 3, the control unit 20 controls the open/close operations of the control valve unit V, the change-over valve 6 (the pressure regulating unit R) and the suction valve 7 and the operation of the motor 9 inside the hydraulic unit 10 based on the signals input from the sensors 91 to 94, for example, thereby controlling the operation of each wheel brake FL/RR/RL/FR. In the first embodiment, the control unit 20 functions as an abnormality judgment device for judging whether the steering angle sensor 92 is normal.

In the first embodiment, the steering angle sensor 92 includes known judging means thereinside for judging whether the steering angle sensor 92 is normal. The judging means outputs a signal ("sensor side signal") indicating whether the steering angle sensor 92 is normal (see FIG. 5A) to the control unit 20. In other words, in the first embodiment, each of the steering angle sensor 92 and the control unit 20 performs abnormality judgment for the steering angle sensor 92.

As shown in FIG. 3, the control unit 20 includes a first diagnosing section 21 configured to perform a first diagnosis for judging whether the steering angle sensor 92 is normal and a behavior controller 22 for controlling the behavior of the vehicle CR. The first diagnosing section 21 includes a first change amount calculator 21A, a first storage section 21B, a reference setting section 21C, a first timer 21D, an incrementing section 21E, a deviation comparator 21F, a first counter 21G, a first preparatory timer 21J, and a first judgment section 21H.

The first change amount calculator 21A calculates the absolute difference between the current value and the previous value of the steering angle obtained from the steering angle sensor 92 and outputs the calculated change amount to the reference setting section 21C.

The first storage section 21B is a storage device, such as a memory, for storing, as a normal threshold value, the maximum change amount that can be calculated by the first change amount calculator 21A when the steering angle sensor 92 is normal. "The maximum change amount that can be obtained by the first change amount calculator 21A when the steering angle sensor 92 is normal" can be determined by experiments, simulations, etc.

The reference setting section 21C compares the change amount obtained from the first change amount calculator 21A with the normal threshold value obtained from the first storage section 21B, and sets the previous value (the steering angle at time t1 in FIG. 5B) of the steering angle to a reference steering angle when the change amount becomes more than the normal threshold value (time t2 in FIG. 5D). The reference setting section 21C sets the reference steering angle, and then outputs the set reference steering angle to the deviation comparator 21F and activates the first timer 21D. At this time, the reference setting section 21C counts up the value of the first counter 21G and resets the value of the first preparatory timer 21J.

When the change amount is less than the normal threshold value, the reference setting section 21C transmits a signal indicating this state to the first judgment section 21H and activates the first preparatory timer 21J.

The first timer 21D sets a first judgment time, and gradually decrements the set first judgment time (see FIG. 5F) upon receiving an activation signal from the reference setting section 21C.

The incrementing section 21E gradually increments the normal threshold value at a predetermined timing during a period until the set first judgment time becomes zero (a period until the first judgment time passes from the time when the change amount became more than the normal threshold value) referring to the value of the first timer 21D (see FIG. 5C). More specifically, the incrementing section 21E adds a constant value to the normal threshold value each time the deviation comparator 21F performs comparison so that the normal threshold value becomes proportional to the number of comparisons performed by the deviation comparator 21F.

In other words, the incrementing section 21E adds the constant value to the normal threshold value each time the time corresponding to the cycle of the comparison by the deviation comparator 21F passes referring to the value of the first timer 21D. The incrementing section 21E outputs the normal threshold value obtained from the first storage section 21B or the normal threshold value obtained by adding the constant value each time the comparison is performed.

The deviation comparator 21F obtains the steering angle (the current value) and the reference steering angle from the reference setting section 21C, and calculates the absolute deviation ("deviation") between the steering angle and the reference steering angle. Also, the deviation comparator 21F compares the calculated deviation with the normal threshold value obtained from the incrementing section 21E, and counts up the value of the first counter 21G when the deviation is larger than the normal threshold value (see FIGS. 5C and 5E). And, the deviation comparator 21F performs the above-mentioned comparison between the deviation and the normal threshold value and the above-mentioned counting up only during the first judgment time referring to the value of the first timer 21D.

The first preparatory timer 21J increments the value thereof upon receiving the activation signal from the reference setting section 21C (see FIG. 7G). After being incremented to a first preparatory judgment time, the value of the first preparatory timer 21J is not incremented further.

The first judgment section 21H judges whether the steering angle sensor 92 is abnormal by judging whether the value of the first counter 21G has reached a predetermined value referring to the value of the first counter 21G. When the value of the first counter 21G has reached the predetermined value, the first judgment section 21H judges that the steering angle sensor 92 is abnormal.

Also, the first judgment section 21H determines whether the value of the first counter 21G is reset referring to the signal (the signal indicating that the change amount is less than the normal threshold value) transmitted from the reference setting section 21C, the value of the first timer 21D and the value of the first preparatory timer 21J. More specifically, the first judgment section 21H judges whether the first judgment time has passed referring to the value of the first timer 21D and also judges whether the change amount is less than the normal threshold value referring to the signal from the reference setting section 21C.

When the first judgment time has passed and that the change amount is less than the normal threshold value, the first judgment section 21H judges whether the first preparatory judgment time has passed after the passage of the first judgment time referring to the value of the first preparatory timer 21J. And, the first judgment section 21H resets the value of the first counter 21G when the first preparatory judgment time has passed.

When the value of the first counter 21G is less than the predetermined value even after the first judgment time has passed, the first judgment section 21H resets the reference steering angle and the normal threshold value to their initial values (see FIGS. 7B and 7C). Then, the first judgment section 21H outputs a signal ("judgment section side signal") indicating whether the steering angle sensor 92 is abnormal to the behavior controller 22.

The behavior controller 22 judges whether the known vehicle behavior control is to be performed based on the judgment section side signal obtained from the first judgment section 21H and the sensor side signal transmitted from the steering angle sensor 92. More specifically, the behavior controller 22 inhibits behavior control when at least one of the judgment section side signal and the sensor side signal indicates abnormality, and performs behavior control when both the judgment section side signal and the sensor side signal indicate normality.

Hence, for example, even when the steering angle sensor 92 is misjudged as normal due to the abnormality of the judging means thereinside and the sensor side signal indicating normality is output, or even when the value output from the steering angle sensor 92 becomes abnormal before reaching the vehicle controller 100 due to the transmission error, the first diagnosing section 21 inside the control unit 20 can perform a judgment again as to whether the steering angle sensor 92 is abnormal. As a result, the accuracy of abnormality judgment can be improved.

Next, the operation of the control unit 20 will be described below referring to FIG. 4.

Figure 4:
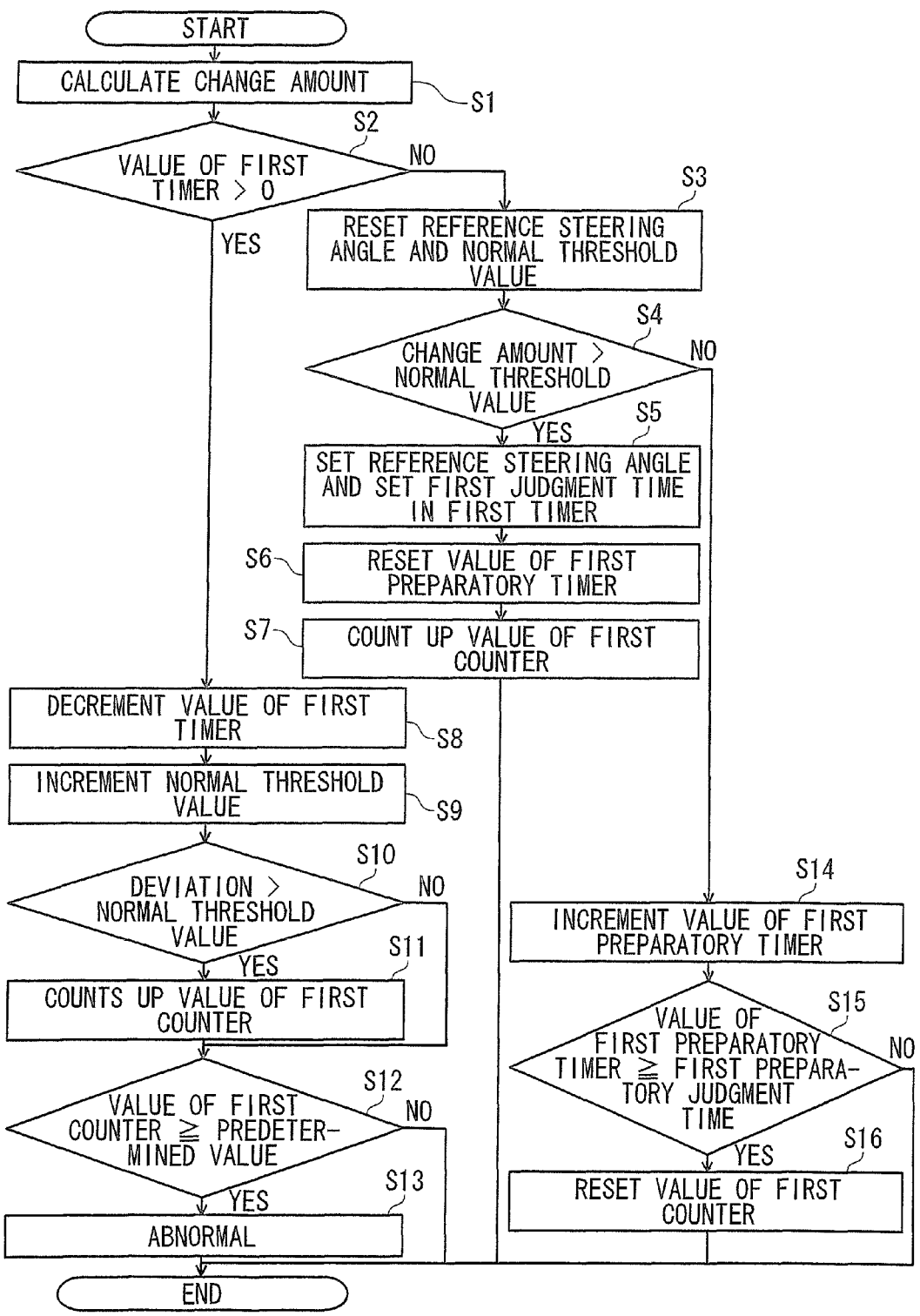
FIG. 4 illustrates the operation of the control unit of FIG. 3.

As shown, in FIG. 4, the control unit 20 calculates the change amount based on the current value and die previous value of the steering angle (at S1), and judges whether the value of the first timer 21D is more than 0 (at S2). When the value of the first timer 21D is 0 (No) at step S2, the control unit 20 resets the reference steering angle and the normal threshold value (at S3) and judges whether the change amount calculated at step S1 is more than the normal threshold value (at S4).

When the change amount is more than the normal threshold value at step S4 (Yes), the control unit 20 sets the previous value of the steering angle obtained at the time as the reference steering angle and sets the first judgment time (at S5). After step S5, the control unit 20 resets the value of the first preparatory timer 21J (at S6) and counts up the value of the first counter 21G (at S7).

When the value of the first timer 21D is more than 0 at step S2 (Yes), the control unit 20 decrements the value of the first timer 21D (at S8), and increments the normal threshold value by a constant value (at S9). After step S9, the control unit 20 judges whether the deviation (absolute difference) between the current value of the steering angle and the reference steering angle is more than the normal threshold value (at S10).

When the deviation is more than the normal threshold value at step S10 (Yes), the control unit 20 counts up the value of the first counter 21G (at S11), and the processing advances to step S12. When the deviation is less than the normal threshold value at step S10 (No), the control unit 20 does not count up the value of the first counter 21G, and the processing advances to step S12.

At step S12, the control unit 20 judges whether the value of the first counter 21G has become equal to or more than the predetermined value (has reached the predetermined value). When the value of the first counter 21G is less than the predetermined value at step S12 (No), the processing of the control unit 20 returns to step S1.

When the value of the first counter 21G is equal to or more than the predetermined value at step S12 (Yes), the control unit 20 judges that the steering angle sensor 92 is abnormal (at S13).

When the change amount is less than the normal threshold value at S4 (No), the control unit 20 increments the value of the first preparatory timer 21J (at S14) and judges whether the value of the first preparatory timer 21J is equal to or more than the first preparatory judgment time (whether the first preparatory judgment time has passed after the passage of the first judgment time) (at S15).

When the value of the first preparatory timer 21J is less than the first preparatory judgment time at step S15 (No), the processing of the control unit 20 directly returns to step S1. When the value of the first preparatory timer 21J is equal to or more than the first preparatory judgment time (Yes), the control unit 20 resets the value of the first counter 21G (at S16), and the processing returns to step S1.

Next, referring to FIGS. 5A to 5G to FIGS. 9A to 9G, examples of diagnosis (normal/abnormal judgment) for the steering angle sensor 92 using the control unit 20 will be described.

In an example of FIGS. 5A to 5G, the output steering angle of the steering angle sensor 92 is changed and fixed to a large value (see FIG. 5B) different from the actual steering angle although the sensor side signal indicates normality (see FIG. 5A). In such case, as shown in FIGS. 5C to 5G, when the change amount becomes more than the normal threshold value (at time t2), the steering angle at time t1 is set as the reference steering angle and the difference between the steering angle and the reference steering angle is calculated. In addition, at this time, the value of the first preparatory timer 21J being incremented to the first preparatory judgment time is reset.

Then, since the deviation is fixed to the large value, even when the normal threshold value becomes larger gradually during the first judgment time, the deviation always exceeds the normal threshold value. Hence, the value of the first counter 21G reaches the predetermined value (at time t3) during the first judgment time. As a result, the steering angle sensor 92 is judged as abnormal.

In an example of FIGS. 6A to 6G, the output steering angle of the steering angle sensor 92 is different from the actual steering angle, and the output steering angle is offset to a larger value and to a further larger value in two steps (see FIG. 6B), although the sensor side signal indicates normality (see FIG. 6A). In such case, as shown in FIGS. 6C to 6F, during a predetermined time (between time t4 to time t5) from the time (time t4) when the change amount becomes more than the normal threshold value, since the deviation is more than the normal threshold value, the value of the first counter 21G is counted up.

After time t5, that is, after the normal threshold value being incremented gradually becomes equal to or more than the deviation, the value of the first counter 21G is not counted up and the value of the first timer 21D is decremented. Then, when the deviation is changed to the further larger value at time t6, the deviation becomes more than the normal threshold value, and the counting up of the value of the first counter 21G is resumed. Thereafter, when the value of the first counter 21G reaches the predetermined value (at time t7), the steering angle sensor 92 is judged as abnormal.

In an example of FIGS. 7A to 7G, the output steering angle of the steering angle sensor 92 is different from the actual steering angle, and the output steering angle is not changed largely, although the sensor side signal indicates normality (see FIG 7A). In such case, as shown in FIGS. 7B to 7G, during a predetermined time (between time t9 to time t10) from the time (time t9) when the change amount becomes more than the normal threshold value, since the deviation is more than the normal threshold value, the value of the first counter 21G is counted up.

After time t10, that is, after the value of the normal threshold value being incremented gradually becomes equal to or more than the deviation, the value of the first counter 21G is not counted up and the value of the first timer 21D is decremented. Then, when the value of the first timer 21D becomes zero (at time t11) while the value of the first counter 21G does not reach the predetermined value, the calculation of the deviation is ended, the reference steering angle and the normal threshold value are reset, and the value of the first preparatory timer 21J is incremented.

Then, when the value of the first preparatory timer 21J reaches the first preparatory judgment time (at time t12), the value of the first counter 21G is reset. Hence, the steering angle sensor 92 is not judged as abnormal.

Figure 8A:
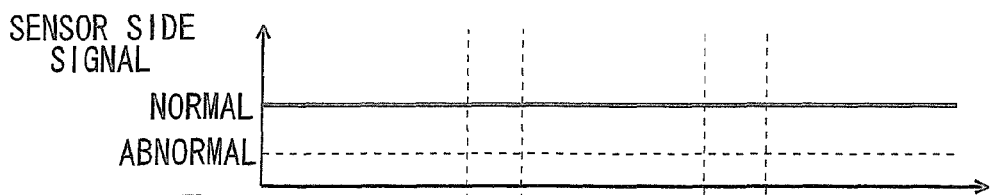
FIGS. 8A to 8G illustrate a diagnosis example when noise is input temporarily from the steering angle sensor of the vehicle.
Figure 8B:
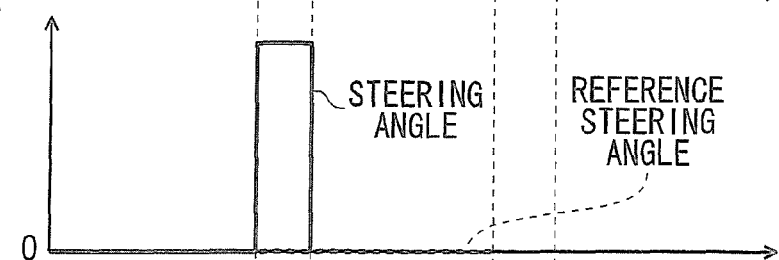
Figure 8C:
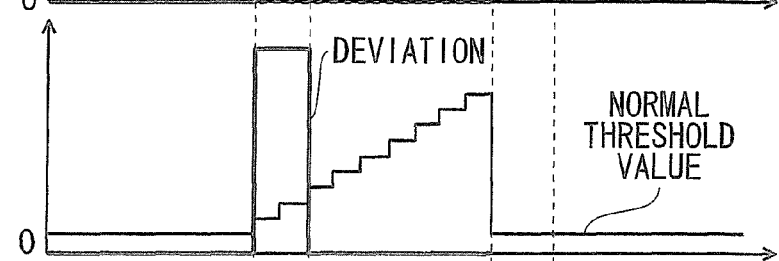
Figure 8D:
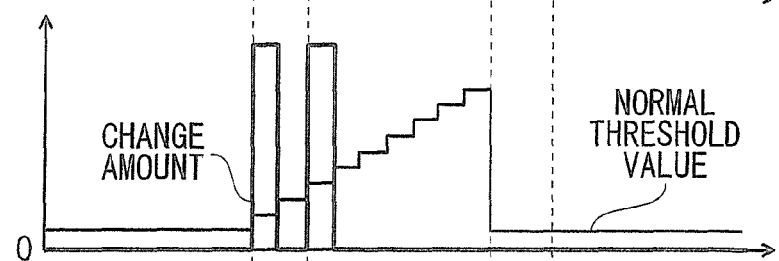
Figure 8E:
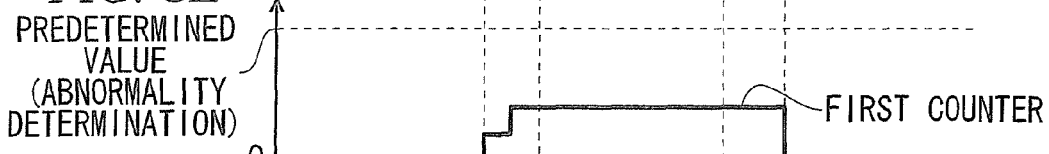
Figure 8F:
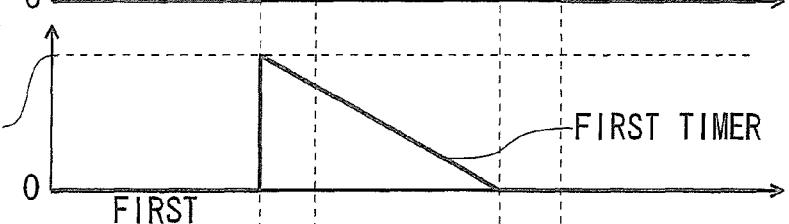
Figure 8G:
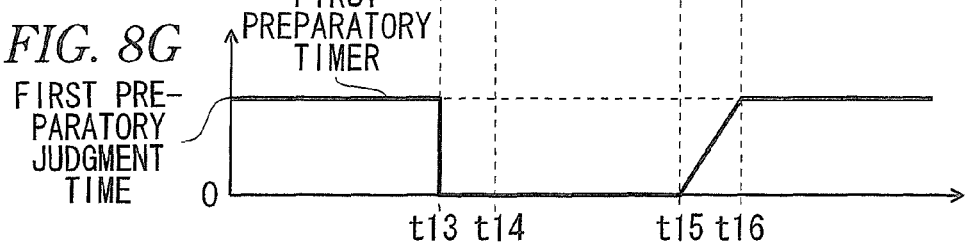

In an example of FIGS. 8A to 8G, noise is input temporarily from the steering angle sensor 92, although the sensor side signal indicates normality (see FIG. 8A). In such case, as shown in FIGS. 8B to 8G, during a predetermined time (between time t13 to time t14) from the time (time t13) when the change amount becomes more than the normal threshold value, since the deviation is more than the normal threshold value, the value of the first counter 21G is counted up.

After time t14, that is, after the noise is not input and when the deviation having been more than the normal threshold value becomes equal to or less than the normal threshold value, the value of the first counter 21G is not counted up, and the value of the first timer 21D is decremented. Then, when the value of the first timer 21D becomes zero (at time t15) while the value of the first counter 21G does not reach the predetermined value, the calculation of the deviation is ended, the reference steering angle and the normal threshold value are reset, and the value of the first preparatory timer 21J is incremented.

Then, when the value of the first preparatory timer 21J reaches the first preparatory judgment time (at time t16), the value of the first counter 21G is reset. Hence, the steering angle sensor 92 is not judged as abnormal.

Figure 9A:
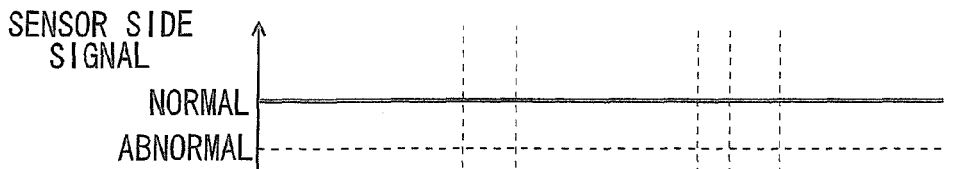
FIGS. 9A to 9G illustrate a diagnosis example after noise is input temporarily from the steering angle sensor and when the steering angle becomes abnormally large and is fixed to the abnormally large value during the increment of the value of a first preparatory timer.
Figure 9B:
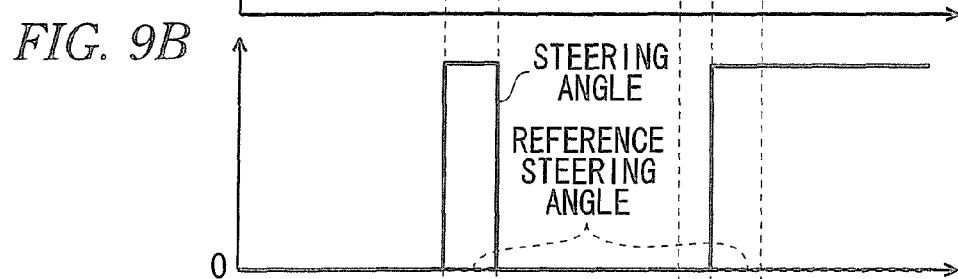
Figure 9C:
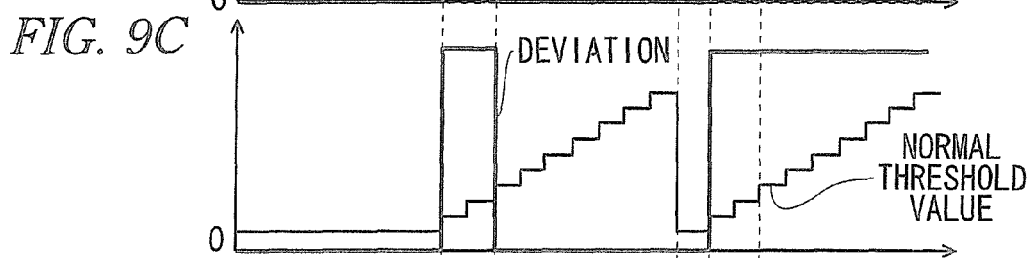
Figure 9D:
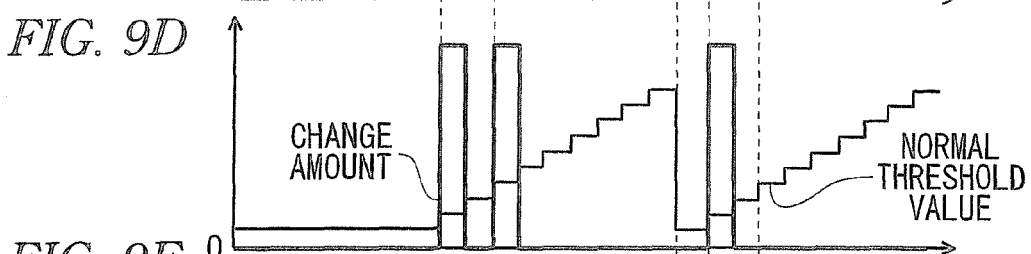
Figure 9E:
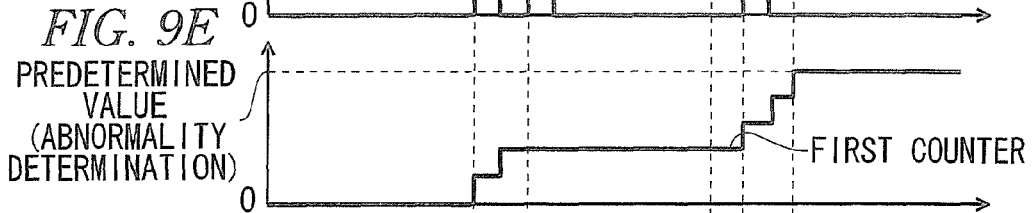
Figure 9F:
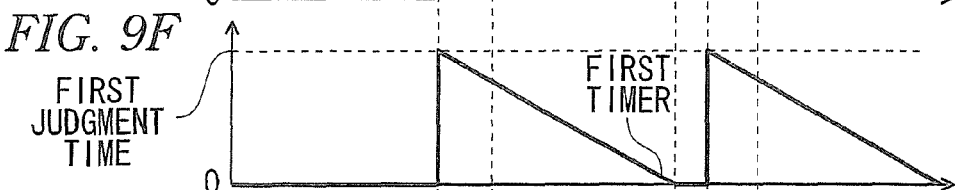
Figure 9G:
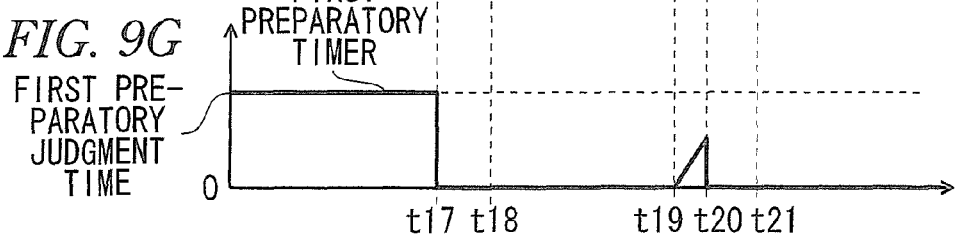

In an example of FIGS. 9A to 9G, noise is input temporarily from the steering angle sensor 92 and then the steering angle becomes abnormally large and fixed to the abnormally large value while the value of the first preparatory timer 21J is incremented, although the sensor side signal indicates normality (see FIG. 9A). In such case, as shown in FIGS. 9B to 9G, during a predetermined time (between time t17 to time t18) from the time (time t17) when the change amount becomes more than the normal threshold value, since the deviation is more than the normal threshold value, the value of the first counter 21G is counted up.

After time t18, that is, after the noise input for the first time disappears and when the deviation having been more than the normal threshold value becomes equal to or less than the normal threshold value, the value of the first counter 21G is not counted up, and the value of the first timer 21D is decremented. Then, when the value of the first timer 21D becomes zero (at time t19) while the first counter 21G does not reach the predetermined value, the calculation of the deviation is ended, the reference steering angle and the normal threshold value are reset, and the value of the first preparatory timer 21J is incremented.

Then, when noise is input for the second time before the value of the first preparatory timer 21J reaches the first preparatory judgment time (at time t20), the value of the first preparatory timer 21J is reset, and the value of the first timer 21D is set to the first judgment time again. At this time, the reference steering angle is set again and the deviation is calculated.

Thereafter, when the deviation becomes more than the normal threshold value, the counting up of the value of the first counter 21G is resumed. When the value of the first counter 21G reaches the predetermined value (at time t21), the steering angle sensor 92 is judged as abnormal. In other words, in the example of FIGS. 9A to 9G, the abnormality judgment is interrupted once since the first judgment time for the first time has passed. At the time, the value of the first counter 21G is not reset and the value of the first counter 21G is maintained during the first judgment time. Hence, when the steering angle becomes abnormal again during the first preparatory judgment time, the value of the first counter 21G can be counted up from the maintained value, whereby the abnormality can be judged easily.

Accordingly, the first embodiment can provide the following effects.

Even when the change amount temporarily becomes more than the normal threshold value, if the value of the first counter 21G has not reached the predetermined value, the steering angle sensor 92 is not judged as abnormal (see FIGS. 7A to 7G). Hence, in the diagnosis for the steering angle sensor 92, misjudgment can be prevented. When abnormality occurs because the steering angle is maintained, fixed or offset to an abnormally high value, the value of the first counter 21G reaches the predetermined value (see FIGS. 5A to 5G and FIGS. 6A to 6G), whereby the abnormality can be judged securely.

The normal threshold value is determined by simple increment wherein the normal threshold value is incremented by a constant value. Hence, it is not necessary to prepare complicated calculating formulas and complicated maps.

Even when the steering angle sensor 92 is misjudged as normal due to the abnormality of the diagnosis function (judging means) therefor, or even when the value output from the steering angle sensor becomes abnormal before reaching the vehicle controller 100 due to the transmission error, the diagnosis can be performed by the control unit 20 (abnormality judgment device) inside the vehicle controller 100. Hence, the accuracy of abnormality judgment can be improved.

[Second Embodiment]

Next, a second embodiment will be described below. This embodiment is obtained by modifying part of the structure of the control unit 20 according to the first embodiment. Components similar to those in the first embodiment are designated by the same reference codes, and their descriptions are omitted.

Figure 10:
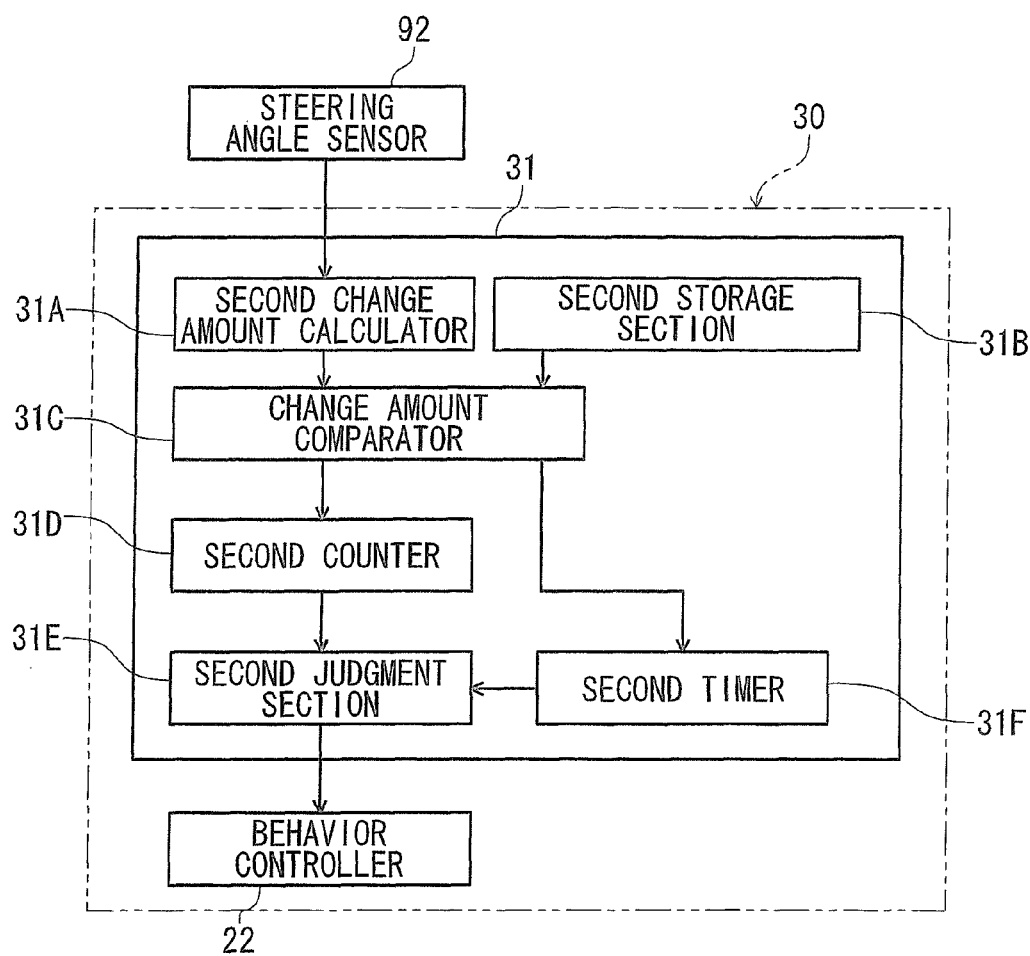
FIG. 10 illustrates a control unit according to a second embodiment.

As shown in FIG. 10, a control unit 30 according to the second embodiment has a behavior controller 22 and a second diagnosing section 31. While the behavior controller 22 is similar to that in the first embodiment, a second diagnosing section 31 performs second diagnosis different from the first diagnosis in the first embodiment. The second diagnosing section 31 includes a second change amount calculator 31A, a second storage section 31B, a change amount comparator 31C, a second counter 31D, a second judgment section 31E, and a second timer 31F.

The second change amount calculator 31A calculates the change amount as the first change amount calculator 21A, and outputs the calculated change amount to the change amount comparator 31C.

The second storage section 31B stores, as the normal threshold value, the maximum change amount that can be calculated by the second change amount calculator 31A when the steering angle sensor 92 is normal, as the first storage section 21B in the first embodiment.

The change amount comparator 31C compares the change amount obtained from the second change amount calculator 31A with the normal threshold value obtained from the second storage section 31B, and counts up the value of the second counter 31D when the change amount becomes more than the normal threshold value. Also, the change amount comparator 31C restarts increment of the value of the second timer 31F from zero each time the value of the second counter 31D is counted up.

The second judgment section 31E judges whether the value of the second counter 31D has reached the predetermined value each time the value of the second counter 31D is counted up, and judges that the steering angle sensor 92 is abnormal under the condition that the value has reached the predetermined value. Also, the second judgment section 31E judges whether a second judgment time has passed after the current counting of the value of the second counter 31D, and resets the value of the second counter 31D under the condition that the second judgment time has passed. More specifically, the second judgment section 31E judges whether the value of the second counter 31D has reached the predetermined value and also judges whether the second judgment time has passed after the count-up time referring to the values of the second counter 31D and the second timer 31F.

Figure 12A:
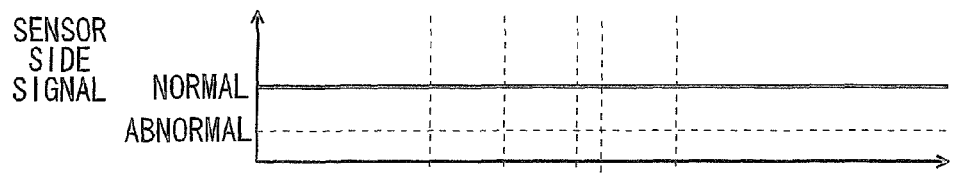
FIGS. 12A to 12E illustrate a diagnosis example when the steering angle is changed largely while having a large amplitude.
Figure 12B:
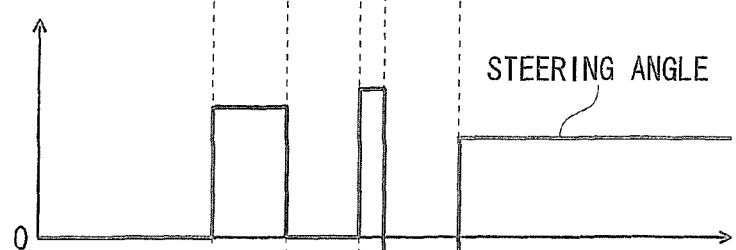
Figure 12C:
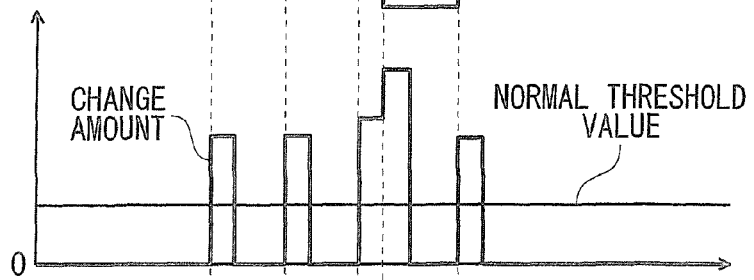
Figure 12D:
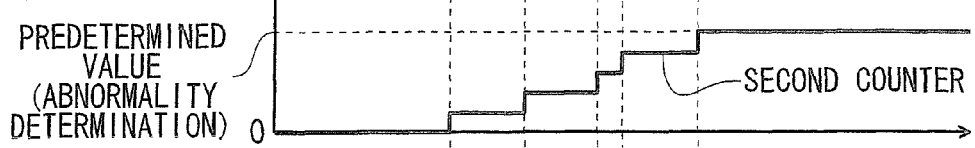
Figure 12E:
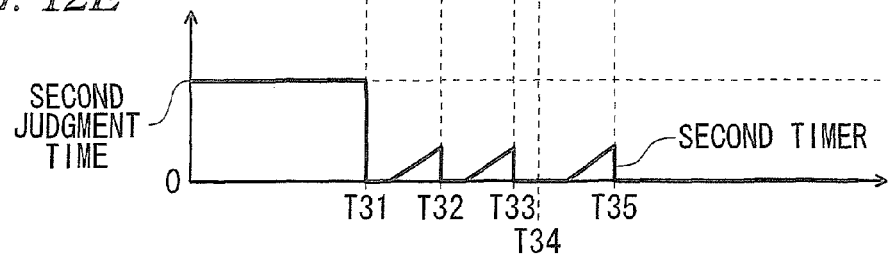

When the value of the second counter 31D has reached the predetermined value before the second judgment time passes, the second judgment section 31E judges that the steering angle sensor is abnormal (see FIGS. 12D and 12E). When the second judgment time has passed, the second judgment section 31E resets the value of the second counter 31D (returns the value to zero, see FIGS. 13D and 13E).

Next, the operation of the control unit 30 will be described below referring to FIG. 11.

Figure 11:
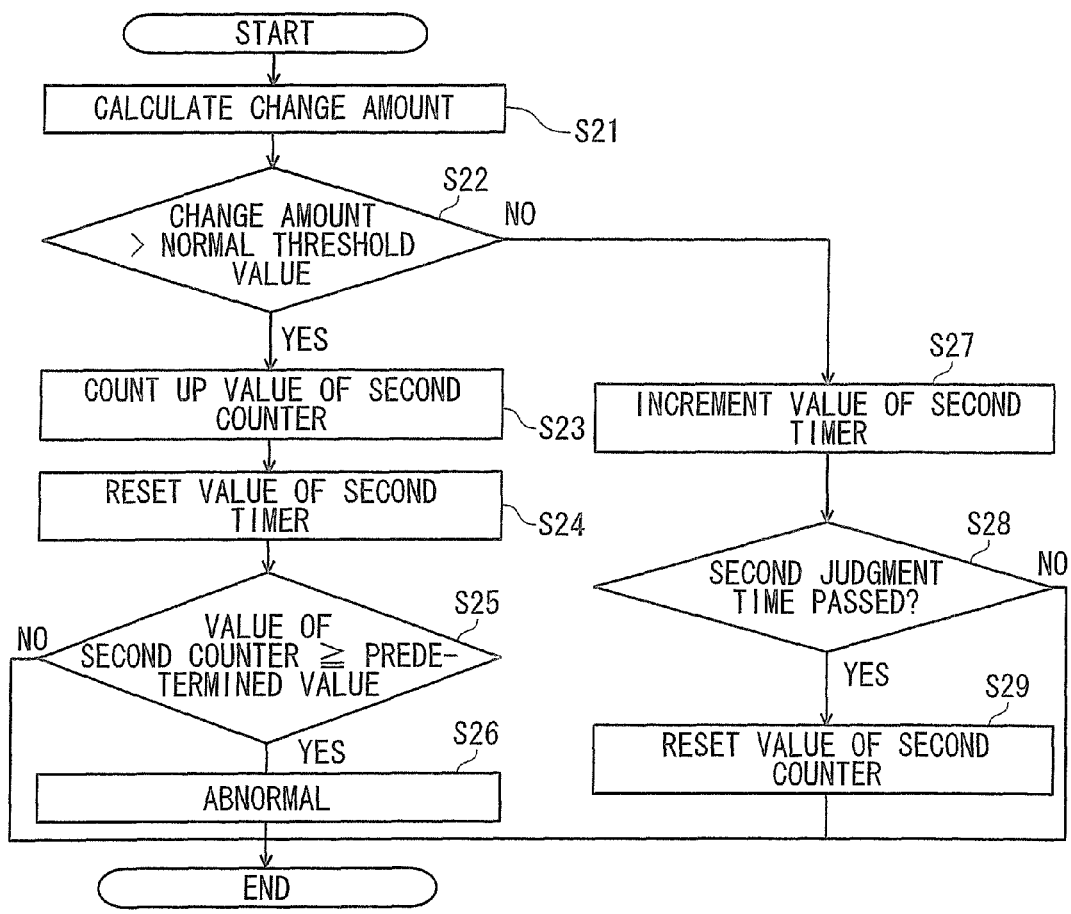
FIG. 11 illustrates the operation of the control unit of FIG. 10.

As shown in FIG. 11, the control unit 30 calculates the change amount based on the current value and the previous value of the steering angle (at S21) and judges whether the calculated change amount is more than the normal threshold value (at S22). When the change amount is more than the normal threshold value at step S22 (Yes), the control unit 30 counts up the value of the second counter 31D (at S23) and resets the value of the second timer 31F (at S24).

After step S24, the control unit 30 judges whether the value of the second counter 31D has become equal to or more than the predetermined value (at S25). When the value of the second counter 31D has become equal to or more than the predetermined value at step S25 (Yes), the control unit 30 judges that the steering angle sensor 92 is abnormal (at S26). When the value is less than the predetermined value (No), the processing directly returns to step S21.

When the change amount is less than the normal threshold value at S22 (No), the control unit 30 increments the value of the second timer 31F (at S27). After step S27, the control unit 30 judges whether the second judgment time has passed referring to the value of the second timer 31F (at S28).

When the second judgment time has passed (Yes) at step S28, the control unit 30 resets the value of the second counter 31D. When the second judgment time has not passed (No), the processing returns to step S21 without resetting the value of the second counter 31D.

Next, referring to FIGS. 12A to 5E to FIGS. 13A to 13E, examples of diagnosis (normal/abnormal judgment) for the steering angle sensor 92 using the control unit 30 will be described.

In an example of FIGS. 12A to 12E, the output steering angle of the steering angle sensor 92 is different from the actual steering angle, and the output steering angle is changed largely while having a large amplitude (see FIG. 12B), although the sensor side signal indicates normality (see FIG. 12A). In such case, as shown in FIGS. 12C to 12E, the value of the second counter 31D is counted up and the value of the second timer 31F is reset each time the change amount becomes more than the normal threshold value (between time t31 to time t35). Hence, since the change amount becomes more than the normal threshold value frequently, the value of the second counter 31D reaches the predetermined value (at time t35) before the value of the second timer 31F reaches the second judgment time. As a result, the steering angle sensor 92 is judged as abnormal.

Figure 13A:
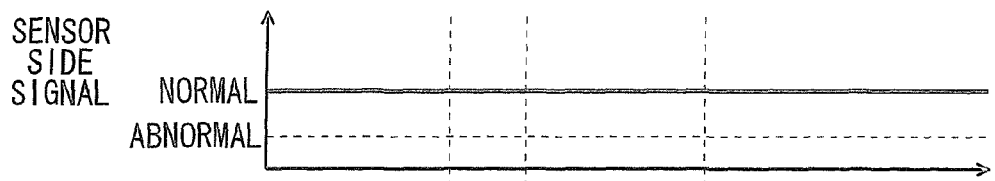
FIGS. 13A to 13E illustrate a diagnosis example when the steering angle is changed to an abnormally large value at first and then returns to a normal value.
Figure 13B:
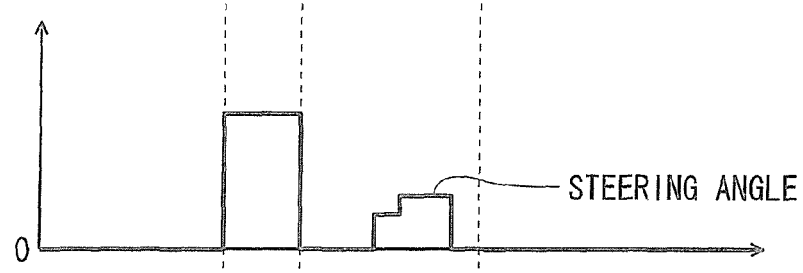
Figure 13C:
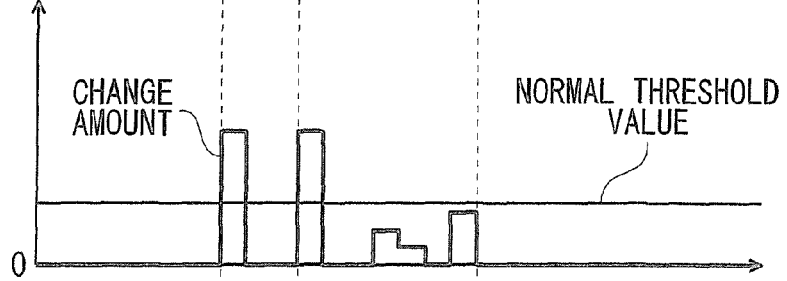
Figure 13D:
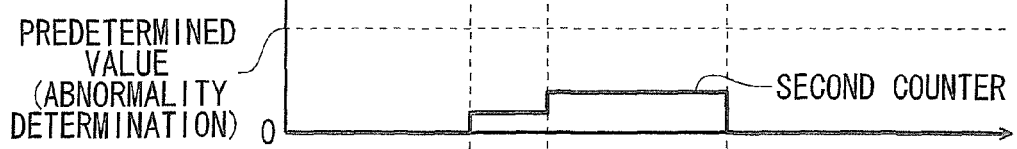
Figure 13E:
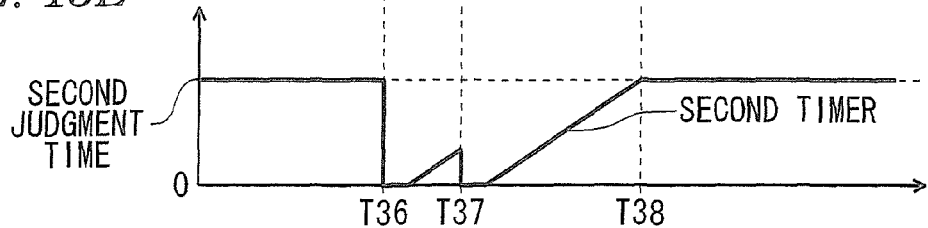

In an example of FIGS. 13A to 13E, the output steering angle of the steering angle sensor 92 is different from the actual steering angle although the sensor side signal indicates normality (see FIG. 13A), but the steering angle has an abnormally large value only at first and becomes coincident with the actual steering angle thereafter (see FIG. 13B). In such case, as shown in FIGS. 13B to 13E, the change amount becomes more than the normal threshold value only when the steering angle is changed largely at first (at time t36) and only when the steering angle is returned to its original value (at time t37). Hence, the value of the second counter 31D is counted up and the value of the second timer 31F is reset only at these times.

After time t37, the steering angle is changed so as to be coincident with the actual steering angle, whereby the change amount does not become more than the normal threshold value. Hence, the value of the second timer 31F is not reset but is counted up. When the value of the second timer 31F reaches the second judgment time (at time t38), the value of the second counter 31D is reset. Therefore, the steering angle sensor 92 is not judged as abnormal.

Accordingly, the second embodiment can provide the following effects.

Even when the change amount temporarily becomes more than the normal threshold value, if the value of the second counter 31D has not reached the predetermined value, the steering angle sensor 92 is not judged as abnormal. Hence, in the diagnosis for the steering angle sensor 92, misjudgment can be prevented (see FIGS. 13A to 13E). When the value obtained from the steering angle sensor 92 oscillates or continuous noise is generated, since the value of the second counter 31D reaches the predetermined value, the abnormality can be judged securely (see FIGS. 12A to 12E).

The present invention is not limited to the above-mentioned embodiments but can be applied to various embodiments exemplified below.

In each embodiment described above, the control unit performs only the first diagnosis or only the second diagnosis. However, both the above-mentioned first diagnosing section 21 and the above-mentioned second diagnosing section 31 can be provided for one control unit. In this case, the first diagnosing section 21 and the second diagnosing section 31 may perform the first diagnosis and the second diagnosis simultaneously by using common values as the steering angle and the change amount. With this configuration, the first diagnosis and the second diagnosis can be performed collaterally by using the common values as the steering angle and the change amount. Hence, since two different diagnosing methods according to information on a single steering angle is used, for example, by judging the steering angle sensor to be abnormal when one of the two diagnosing section judges that the steering angle sensor is abnormal, the abnormality can be judged rapidly. Alternatively, by judging the steering angle sensor to be abnormal when both the two diagnosing section judge that the sensor is abnormal, careful judgment can be performed even in a situation where noise is likely to be introduced.

In each embodiment described above, the abnormality judgment device (the first diagnosing section 21 or the second diagnosing section 31) is provided in the vehicle controller 100. However, the abnormality judgment devices may be provided inside the steering angle sensor, for example.

In the above-mentioned embodiments, the values of the first counter 21G and the second counter 31D are respectively counted up. However, the values thereof may be counted down.

The invention claimed is:

1. An abnormality judgment device having a first diagnosing section configured to perform a first diagnosis for judging whether a steering angle sensor is normal, the first diagnosing section periodically obtaining a steering angle from the steering angle sensor, the first diagnosing section comprising:
a first change amount calculator configured to calculate an absolute difference between a currently-obtained steering angle and a previously-obtained steering angle, as a change amount;
a first storage section configured to store a maximum value of the change amount which is calculable by the first change amount calculator when the steering angle sensor is normal, as a normal threshold value;
a reference setting section configured to set the previously-obtained steering angle as a reference steering angle when the change amount exceeds the normal threshold value;

an incrementing section configured to continue gradually incrementing the normal threshold value after the change amount exceeds the normal threshold value, for a first judgment time;

a deviation comparator configured to compare an absolute deviation between the currently-obtained steering angle and the reference steering angle with the gradually-incremented normal threshold value, and to count a first counter when the absolute deviation exceeds the normal threshold value, for the first judgment time; and a first judgment section configured to judge that the steering angle sensor is abnormal when the first counter reaches a predetermined value within the first judgment time.

2. The abnormality judgment device of claim 1, wherein the incrementing section continues adding a constant value to the normal threshold value each time the deviation comparator performs a comparison so that the normal threshold value becomes proportional to the number of comparisons.

3. The abnormality judgment device of claim 1, wherein, after a passage of the first judgment time, the first judgment section judges whether the change amount is kept below the normal threshold value for a first preparatory judgment time, and resets the first counter when the change amount is kept below the normal threshold value for the first preparatory judgment time.

4. The abnormality judgment device of claim 1, further having a second diagnosing section configured to perform a second diagnosis for judging whether the steering angle sensor is normal, the second diagnosing section periodically obtaining the steering angle from the steering angle sensor, the second diagnosing section comprising:

a second change amount calculator configured to calculate the absolute difference between the currently-obtained steering angle and the previously-obtained steering angle, as the change amount;

a second storage section configured to store a maximum value of the change amount which is calculable by the second change amount calculator when the steering angle sensor is normal, as the normal threshold value;

a change amount comparator configured to compare the change amount with the normal threshold value, and to count a second counter when the change amount exceeds the normal threshold value; and a second judgment section configured to judge whether the second counter reaches a second predetermined value each time the change amount exceeds the normal threshold value, to judge that the steering angle sensor is abnormal when the second counter reaches the second predetermined value, and to reset the second counter when a second judgment time has passed while the second counter is kept below the second predetermined value after the second counter is last counted.

5. A vehicle controller comprising:

the abnormality judgment device of claim 1.

6. An abnormality judgment device having a second diagnosing section configured to perform a second diagnosis for judging whether a steering angle sensor is normal, the second diagnosing section periodically obtaining a steering angle from the steering angle sensor, the second diagnosing section comprising:

a second change amount calculator configured to calculate an absolute difference between a currently-obtained steering angle and a previously-obtained steering angle, as a change amount;

a second storage section configured to store a maximum value of the change amount which is calculable by the second change amount calculator when the steering angle sensor is normal, as a normal threshold value;

a change amount comparator configured to compare the change amount with the normal threshold value, and to count a second counter when the change amount exceeds the normal threshold value; and a second judgment section configured to judge whether the second counter reaches a predetermined value each time the change amount exceeds the normal threshold value, to judge that the steering angle sensor is abnormal when the second counter reaches the predetermined value, and to reset the second counter when a second judgment time has passed while the second counter is kept below the predetermined value after the second counter is last counted.

* * * * *